US006484555B1

(12) United States Patent
Perry et al.

(10) Patent No.: US 6,484,555 B1
(45) Date of Patent: Nov. 26, 2002

(54) METHOD OF CALIBRATING AN INTEGRATED PRESSURE MANAGEMENT APPARATUS

(75) Inventors: Paul D. Perry; John E. Cook, both of Chatham (CA)

(73) Assignee: Siemens Canada Limited (CA)

( * ) Notice: Subject to any disclaimer, the term of this patent is extended or adjusted under 35 U.S.C. 154(b) by 0 days.

(21) Appl. No.: 09/543,747

(22) Filed: Apr. 5, 2000

Related U.S. Application Data

(60) Provisional application No. 60/166,404, filed on Nov. 19, 1999.

(51) Int. Cl.[7] ......................... G01L 27/00; F16K 11/20; H01H 35/34

(52) U.S. Cl. ....................... 73/1.71; 73/1.35; 73/119 A; 200/83 R

(58) Field of Search .............................. 73/1.71, 119 A, 73/37, 1.35; 200/81 R, 83 R, 83 S

(56) References Cited

U.S. PATENT DOCUMENTS

| | | | |
|---|---|---|---|
| 2,615,327 A | * 10/1952 | Foust et al. | 73/1.71 |
| 3,110,502 A | 11/1963 | Pagano | 277/189 |

(List continued on next page.)

FOREIGN PATENT DOCUMENTS

| | | |
|---|---|---|
| EP | 0 688 691 A1 | 12/1995 |
| WO | WO 99/50551 | 7/1999 |

OTHER PUBLICATIONS

U.S. Patent Appln. No. 09893,530, Craig Weldon, filed Jun. 29, 2001.

U.S. Patent Appln. No. 09/893,508, Craig Weldon, filed Jun. 29, 2001.

U.S. Patent Appln. No. 09/566, 138, Paul D. Perry, filed May 5, 2000.

U.S. Patent Appln, No. 09/566,137, Paul D. Perry, filed May 5, 2000.

U.S. Patent Appln. No. 09/566,136, Paul D. Perry et al., filed May 5, 2000.

U.S. Patent Appln. No. 09/566,135, Paul D. Perry, filed May 5, 2000.

U.S. Patent Appln. No. 09/566,133, Paul D. Perry, filed May 5, 2000.

U.S. Patent Appln. No. 09/565,028, Paul D. Perry, filed May 5, 2000.

U.S. Patent Appln. No. 09/543,748, Paul D. Perry, filed Apr. 5, 2000.

U.S. Patent Appln. No. 09/543,742, Paul D. Perry, filed Apr. 5, 2000.

U.S. Patent Appln. No. 09/543,741, Paul D. Perry, filed Apr. 5, 2000.

U.S. Patent Appln. No. 09/543,740, Paul D. Perry, filed Mar. 31,2000.

U.S. Patent Appln. No. 09/542,052, Paul D. Perry, filed Mar. 31, 2000.

U.S. Patent Appln. No. 09/540,491, Paul D. Perry, filed Mar. 31,2000.

U.S. Patent Appln. No. 09/275,250, John E. Cook et al., filed Mar. 24, 1999.

U.S. Patent Appln. No. 09/165,772, John E. Cook et al., filed Oct. 2, 1998.

*Primary Examiner*—Hezron Williams
*Assistant Examiner*—David J. Wiggins

(57) ABSTRACT

A method of calibrating an integrated pressure management apparatus having a chamber with an interior volume varying in response to fluid pressure in the chamber. A diaphragm partially defining the chamber is displaceable between first and second configurations in response to fluid pressure variations around a certain pressure level. A resilient element applies a force biasing the diaphragm a first configuration and a switch is actuated by the diaphragm in the second configuration. The method includes connecting the chamber to a pressure source at a known pressure level, and adjusting resilient element such that the switch is actuated at the known pressure level.

2 Claims, 3 Drawing Sheets

U.S. PATENT DOCUMENTS 3,190,322 A 6/1965 Brown ........................ 141/387
3,413,840 A 12/1968 Basile et al. .................... 73/40
3,516,279 A * 6/1970 Maziarka .......................... 73/4
3,586,016 A 6/1971 Meyn ........................... 137/39
3,640,501 A 2/1972 Walton ........................ 251/332
3,702,090 A * 11/1972 Halpert et al. ................ 73/4 R
3,720,090 A 3/1973 Halpert et al. ................... 73/4
3,802,267 A 4/1974 Lofink ......................... 73/279
3,841,344 A 10/1974 Slack .......................... 137/88
3,861,646 A 1/1975 Douglas ..................... 251/356
3,927,553 A * 12/1975 Frantz ......................... 73/4 R
4,009,985 A 3/1977 Hirt .............................. 431/5
4,136,854 A 1/1979 Ehmig et al. ............... 251/333
4,164,168 A 8/1979 Tateoka ....................... 91/376
4,166,485 A 9/1979 Wokas ......................... 141/52
4,215,846 A 8/1980 Ishizuka et al. ............ 251/298
4,240,467 A 12/1980 Blatt et al. ............. 137/625.66
4,244,554 A 1/1981 DiMauro et al. .......... 251/61.1
4,354,383 A 10/1982 Hártel ......................... 73/290
4,368,366 A 1/1983 Kiamura et al. .............. 200/83
4,474,208 A 10/1984 Looney ................. 137/516.29
4,494,571 A 1/1985 Seegers et al. ........ 137/596.16
4,518,329 A 5/1985 Weaver ...................... 417/566
4,561,297 A * 12/1985 Holland .................... 73/119 A
4,616,114 A 10/1986 Strasser ....................... 200/83
4,717,117 A 1/1988 Cook ........................ 251/61.1
4,766,557 A 8/1988 Twerdochlib ................ 702/51
4,766,927 A 8/1988 Conatser ..................... 137/315
4,852,054 A 7/1989 Mastandrea .................. 702/51
4,901,559 A 2/1990 Grabner ..................... 73/64.45
4,905,505 A 3/1990 Reed ......................... 73/64.46
5,036,823 A 8/1991 MacKinnon ................ 123/520
5,069,188 A 12/1991 Cook ......................... 123/520
5,090,234 A 2/1992 Maresca, Jr. et al. ........ 73/49.1
5,096,029 A 3/1992 Bauer et al. ................ 188/300
5,101,710 A 4/1992 Baucom ..................... 454/238
5,253,629 A 10/1993 Fornuto et al. ............. 123/519
5,259,424 A 11/1993 Miller et al. ................... 141/4
5,263,462 A 11/1993 Reddy ........................ 123/520
5,273,071 A 12/1993 Oberrecht .............. 137/614.06
5,327,934 A 7/1994 Thompson .................. 137/588
5,337,262 A * 8/1994 Luthi et al. ................. 364/580
5,372,032 A 12/1994 Filippi et al. ................ 73/40.5
5,375,455 A 12/1994 Maresca , Jr. et al. ....... 73/40.5
5,388,613 A 2/1995 Krúger .................. 137/625.34
5,390,643 A 2/1995 Sekine ....................... 123/514
5,390,645 A 2/1995 Cook et al. ................. 123/520
5,415,033 A 5/1995 Maresca, Jr. et al. ........ 73/40.5
5,437,257 A 8/1995 Giacomazzi et al. ........ 123/520
5,448,980 A 9/1995 Kawamura et al. ......... 123/520
5,474,050 A 12/1995 Cook et al. ................. 123/520
5,507,176 A 4/1996 Kammeraad et al. ........ 73/49.2
5,524,662 A 6/1996 Benjey et al. ................ 137/43
5,564,306 A 10/1996 Miller ......................... 73/861
5,579,742 A 12/1996 Yamazaki et al. .......... 123/520
5,584,271 A 12/1996 Sakata ..................... 123/188.6
5,603,349 A 2/1997 Harris ........................ 137/588
5,614,665 A 3/1997 Curran et al. .............. 73/118.1
5,635,630 A 6/1997 Dawson et al. ............. 123/520
5,644,072 A 7/1997 Chirco et al. ................ 73/49.2
5,671,718 A 9/1997 Curran et al. ............... 123/520
5,681,151 A 10/1997 Wood ......................... 417/307
5,687,633 A 11/1997 Eady ............................. 92/97
5,743,169 A 4/1998 Yamala ........................ 92/100
5,826,566 A 10/1998 Isobe et al. ................. 123/520
5,884,609 A 3/1999 Kawamoto et al. ......... 123/520
5,893,389 A 4/1999 Cunningham .......... 137/516.27
5,894,784 A 4/1999 Bobbitt, III et al. .......... 92/100
5,911,209 A 6/1999 Kouda et al. ............... 123/520
5,979,869 A 11/1999 Hiddessen .................. 251/285
6,003,499 A 12/1999 Devall et al. ............... 123/520
6,073,487 A 6/2000 Dawson ..................... 73/118.1
6,089,081 A 7/2000 Cook et al. ................ 73/118.1
6,142,062 A 11/2000 Streitman ...................... 92/99
6,145,430 A 11/2000 Able et al. ...................... 92/93
6,168,168 B1 1/2001 Brown ....................... 277/637
6,202,688 B1 3/2001 Khadim ................. 137/599.08
6,203,022 B1 3/2001 Struschka et al. .......... 277/572
6,328,021 B1 12/2001 Perry et al. ................. 123/518

* cited by examiner

METHOD OF CALIBRATING AN INTEGRATED PRESSURE MANAGEMENT APPARATUS

CROSS REFERENCE TO RELATED APPLICATIONS

This application claims the benefit of the earlier filing date of U.S. Provisional Application No. 60/166,404, filed Nov. 19 1999, which is incorporated by reference herein in its entirety.

FIELD OF INVENTION

The present invention relates to a method of calibrating an integrated pressure management system that manages pressure and detects leaks in a fuel system. The present invention also relates to a method of calibrating an integrated pressure management system that performs a leak diagnostic for the headspace in a fuel tank, a canister that collects volatile fuel vapors from the headspace, a purge valve, and all associated hoses.

BACKGROUND OF INVENTION

In a conventional pressure management system for a vehicle, fuel vapor that escapes from a fuel tank is stored in a canister. If there is a leak in the fuel tank, canister or any other component of the vapor handling system, some fuel vapor could exit through the leak to escape into the atmosphere instead of being stored in the canister. Thus, it is desirable to detect leaks.

In such conventional pressure management systems, excess fuel vapor accumulates immediately after engine shutdown, thereby creating a positive pressure in the fuel vapor management system. Thus, it is desirable to vent, or "blow-off," through the canister, this excess fuel vapor and to facilitate vacuum generation in the fuel vapor management system. Similarly, it is desirable to relieve positive pressure during tank refueling by allowing air to exit the tank at high flow rates. This is commonly referred to as onboard refueling vapor recovery (ORVR).

SUMMARY OF THE INVENTION

A sensor or switch signals that a predetermined pressure exists. In particular, the sensor/switch signals that a predetermined vacuum exists. As it is used herein, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

The present invention is achieved by providing a method.

BRIEF DESCRIPTION OF THE DRAWINGS

The accompanying drawings, which are incorporated herein and constitute part of this specification, illustrate the present invention, and, together with the general description given above and the detailed description given below, serve to explain features of the invention. Like reference numerals are used to identify similar features.

DETAILED DESCRIPTION OF THE PREFERRED EMBODIMENT

Figure 1:
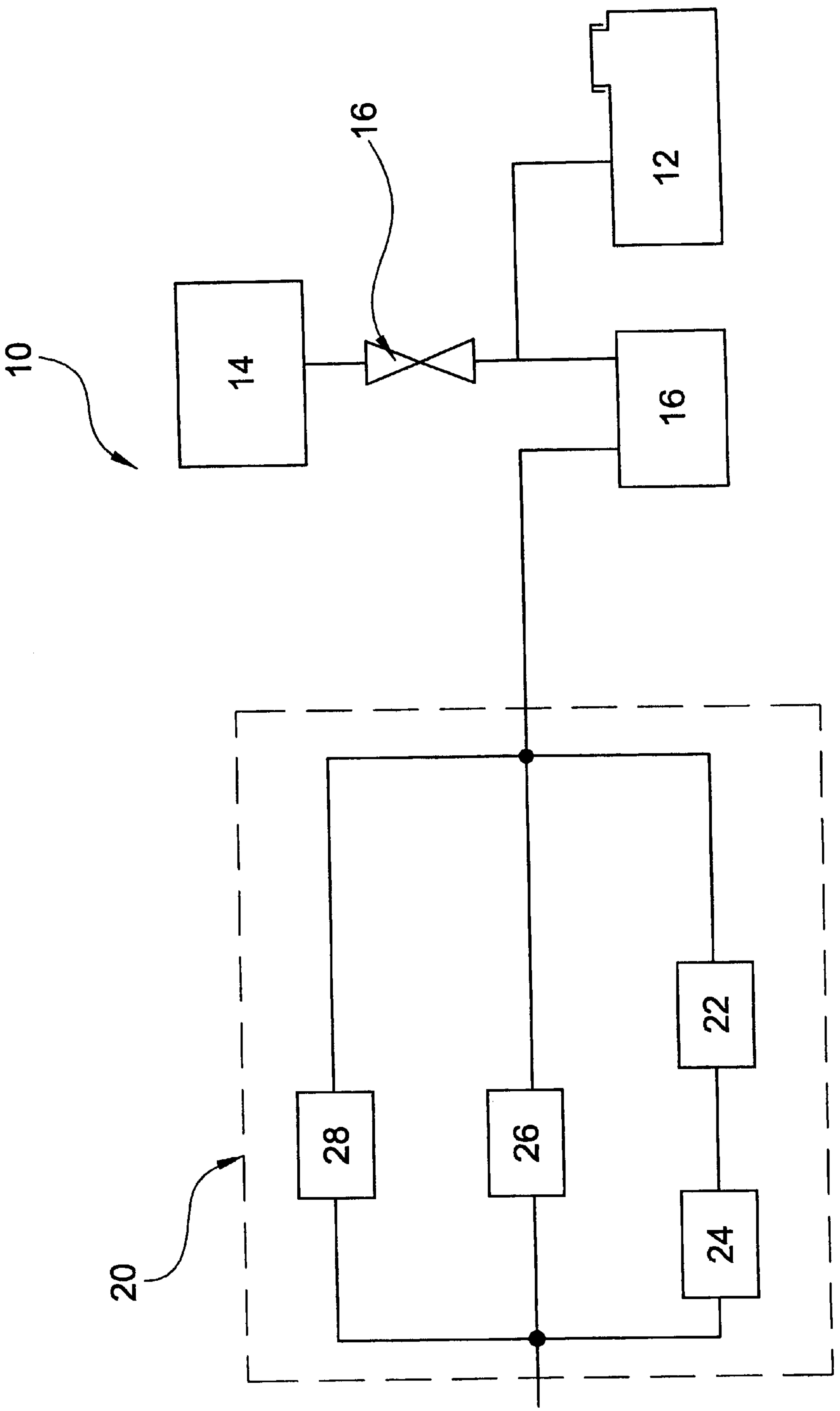
FIG. 1 is a schematic illustration showing the operation of an apparatus according to the present invention.

Referring to FIG. 1, a fuel system 10, e.g., for an engine (not shown), includes a fuel tank 12, a vacuum source 14 such as an intake manifold of the engine, a purge valve 16, a charcoal canister 18, and an integrated pressure management system (IPMA) 20.

The IPMA 20 performs a plurality of functions including signaling 22 that a first predetermined pressure (vacuum) level exists, relieving pressure 24 at a value below the first predetermined pressure level, relieving pressure 26 above a second pressure level, and controllably connecting 28 the charcoal canister 18 to the ambient atmospheric pressure A.

In the course of cooling that is experienced by the fuel system 10, e.g., after the engine is turned off, a vacuum is created in the tank 12 and charcoal canister 18. The existence of a vacuum at the first predetermined pressure level indicates that the integrity of the fuel system 10 is satisfactory. Thus, signaling 22 is used for indicating the integrity of the fuel system 10, i.e., that there are no leaks. Subsequently relieving pressure 24 at a pressure level below the first predetermined pressure level protects the integrity of the fuel tank 12, i.e., prevents it from collapsing due to vacuum in the fuel system 10. Relieving pressure 24 also prevents "dirty" air from being drawn into the tank 12.

Immediately after the engine is turned off, relieving pressure 26 allows excess pressure due to fuel vaporization to blow off, thereby facilitating the desired vacuum generation that occurs during cooling. During blow off, air within the fuel system 10 is released while fuel molecules are retained. Similarly, in the course of refueling the fuel tank 12, relieving pressure 26 allows air to exit the fuel tank 12 at high flow.

While the engine is turned on, controllably connecting 28 the canister 18 to the ambient air A allows confirmation of the purge flow and allows confirmation of the signaling 22 performance. While the engine is turned off, controllably connecting 28 allows a computer for the engine to monitor the vacuum generated during cooling.

Figure 2:
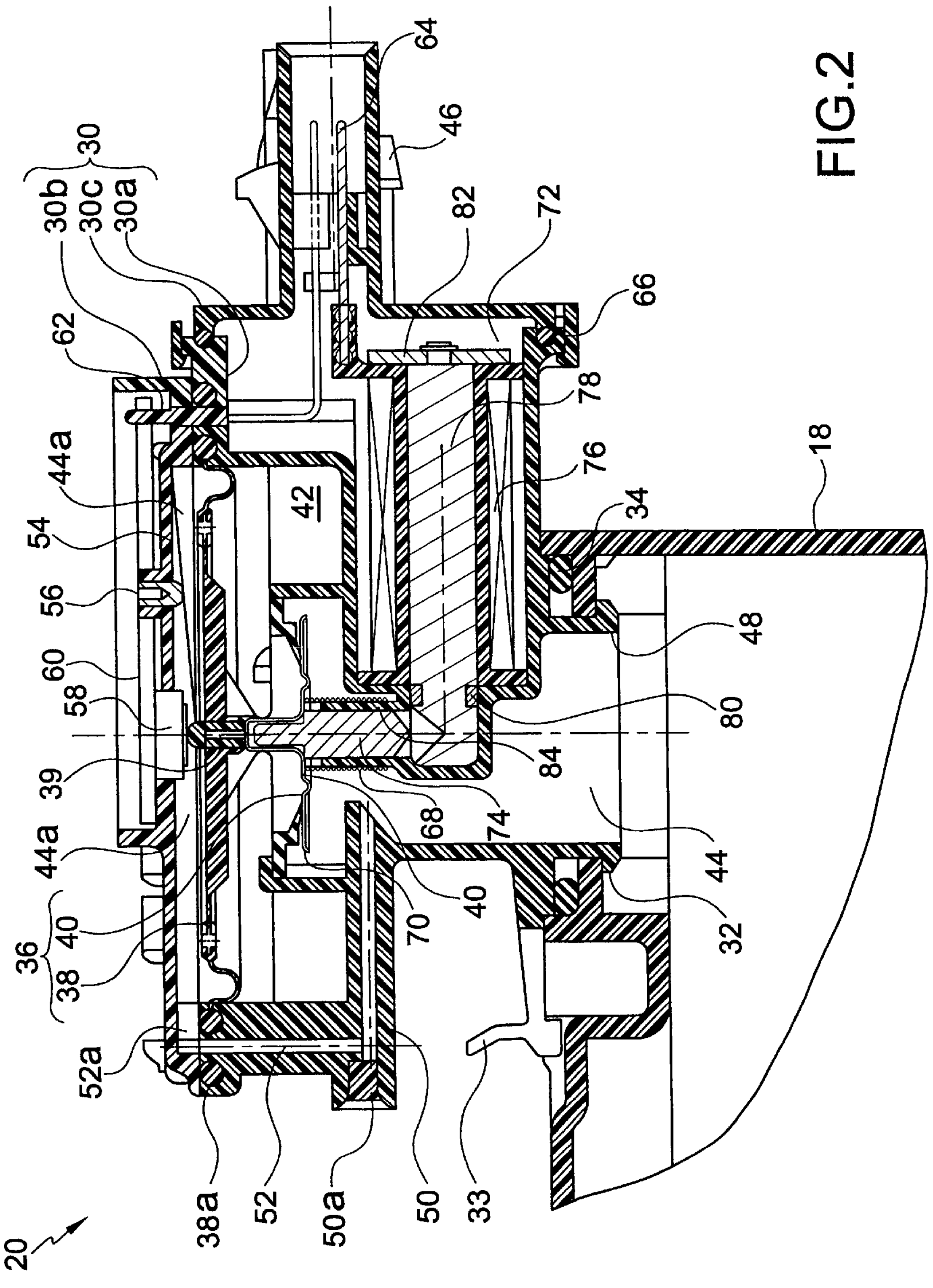
FIG. 2 is a cross-sectional view of a first embodiment of the apparatus according to the present invention.

FIG. 2, shows a first embodiment of the IPMA 20 mounted on the charcoal canister 18. The IPMA 20 includes a housing 30 that can be mounted to the body of the charcoal canister 18 by a "bayonet" style attachment 32. A seal 34 is interposed between the charcoal canister 18 and the IPMA 20. This attachment 32, in combination with a snap finger 33, allows the IPMA 20 to be readily serviced in the field. Of course, different styles of attachments between the IPMA 20 and the body 18 can be substituted for the illustrated bayonet attachment 32, e.g., a threaded attachment, an interlocking telescopic attachment, etc. Alternatively, the body 18 and the housing 30 can be integrally formed from a common homogenous material, can be permanently bonded together (e.g., using an adhesive), or the body 18 and the housing 30 can be interconnected via an intermediate member such as a pipe or a flexible hose.

The housing 30 can be an assembly of a main housing piece 30*a* and housing piece covers 30*b* and 30*c*. Although two housing piece covers 30*b*,30*c* have been illustrated, it is desirable to minimize the number of housing pieces to reduce the number of potential leak points, i.e., between housing pieces, which must be sealed. Minimizing the number of housing piece covers depends largely on the fluid flow path configuration through the main housing piece 30*a* and the manufacturing efficiency of incorporating the necessary components of the IPMA 20 via the ports of the flow path. Additional features of the housing 30 and the incorporation of components therein will be further described below.

Signaling 22 occurs when vacuum at the first predetermined pressure level is present in the charcoal canister 18. A pressure operable device 36 separates an interior chamber in the housing 30. The pressure operable device 36, which includes a diaphragm 38 that is operatively interconnected to a valve 40, separates the interior chamber of the housing 30 into an upper portion 42 and a lower portion 44. The upper portion 42 is in fluid communication with the ambient atmospheric pressure through a first port 46. The lower portion 44 is in fluid communication with a second port 48 between housing 30 the charcoal canister 18. The lower portion 44 is also in fluid communicating with a separate portion 44*a* via first and second signal passageways 50,52. Orienting the opening of the first signal passageway toward the charcoal canister 18 yields unexpected advantages in providing fluid communication between the portions 44,44*a*. Sealing between the housing pieces 30*a*,30*b* for the second signal passageway 52 can be provided by a protrusion 38*a* of the diaphragm 38 that is penetrated by the second signal passageway 52. A branch 52*a* provides fluid communication, over the seal bead of the diaphragm 38, with the separate portion 44*a*. A rubber plug 50*a* is installed after the housing portion 30*a* is molded. The force created as a result of vacuum in the separate portion 44*a* causes the diaphragm 38 to be displaced toward the housing part 30*b*. This displacement is opposed by a resilient element 54, e.g., a leaf spring. The bias of the resilient element 54 can be adjusted by a calibrating screw 56 such that a desired level of vacuum, e.g., one inch of water, will depress a switch 58 that can be mounted on a printed circuit board 60. In turn, the printed circuit board is electrically connected via an intermediate lead frame 62 to an outlet terminal 64 supported by the housing part 30*c*. An O-ring 66 seals the housing part 30*c* with respect to the housing part 30*a*. As vacuum is released, i.e., the pressure in the portions 44,44*a* rises, the resilient element 54 pushes the diaphragm 38 away from the switch 58, whereby the switch 58 resets.

According to the present invention, a certain desired level of vacuum is calibrated by connecting the IPMA 20 to a pressure source at a known level of vacuum. This calibration can be performed in-situ, i.e., while the IPMA 20 is mounted on a vehicle. This calibration can also be an iterative process wherein the calibrating screw 56 is adjusted between occurrences of connecting the IPMA 20 to the pressure source at the known level of vacuum, i.e., calibrating screw 56 can be turned when the IPMA 20 is disconnected from the pressure source, with activation of the switch 58 being determined for a subsequent connection of the IPMA to the pressure source.

Pressure relieving 24 occurs as vacuum in the portions 44,44*a* increases, i.e., the pressure decreases below the calibration level for actuating the switch 58. Vacuum in the charcoal canister 18 and the lower portion 44 will continually act on the valve 40 inasmuch as the upper portion 42 is always at or near the ambient atmospheric pressure A. At some value of vacuum below the first predetermined level, e.g., six inches of water, this vacuum will overcome the opposing force of a second resilient element 68 and displace the valve 40 away from a lip seal 70. This displacement will open the valve 40 from its closed configuration, thus allowing ambient air to be drawn through the upper portion 42 into the lower the portion 44. That is to say, in an open configuration of the valve 40, the first and second ports 46,48 are in fluid communication. In this way, vacuum in the fuel system 10 can be regulated.

Controllably connecting 28 to similarly displace the valve 40 from its closed configuration to its open configuration can be provided by a solenoid 72. At rest, the second resilient element 68 displaces the valve 40 to its closed configuration. A ferrous armature 74, which can be fixed to the valve 40, can have a tapered tip that creates higher flux densities and therefore higher pull-in forces. A coil 76 surrounds a solid ferrous core 78 that is isolated from the charcoal canister 18 by an O-ring 80. The flux path is completed by a ferrous strap 82 that serves to focus the flux back towards the armature 74. When the coil 76 is energized, the resultant flux pulls the valve 40 toward the core 78. The armature 74 can be prevented from touching the core 78 by a tube 84 that sits inside the second resilient element 68, thereby preventing magnetic lock-up. Since very little electrical power is required for the solenoid 72 to maintain the valve 40 in its open configuration, the power can be reduced to as little as 10% of the original power by pulse-width modulation. When electrical power is removed from the coil 76, the second resilient element 68 pushes the armature 74 and the valve 40 to the normally closed configuration of the valve 40.

Relieving pressure 26 is provided when there is a positive pressure in the lower portion 44, e.g., when the tank 12 is being refueled. Specifically, the valve 40 is displaced to its open configuration to provide a very low restriction path for escaping air from the tank 12. When the charcoal canister 18, and hence the lower portions 44, experience positive pressure above ambient atmospheric pressure, the first and second signal passageways 50,52 communicate this positive pressure to the separate portion 44*a*. In turn, this positive pressure displaces the diaphragm 38 downward toward the valve 40. A diaphragm pin 39 transfers the displacement of the diaphragm 38 to the valve 40, thereby displacing the valve 40 to its open configuration with respect to the lip seal 70. Thus, pressure in the charcoal canister 18 due to refueling is allowed to escape through the lower portion 44, past the lip seal 70, through the upper portion 42, and through the second port 46.

Relieving pressure 26 is also useful for regulating the pressure in fuel tank 12 during any situation in which the engine is turned off. By limiting the amount of positive pressure in the fuel tank 12, the cool-down vacuum effect will take place sooner.

Figure 3:
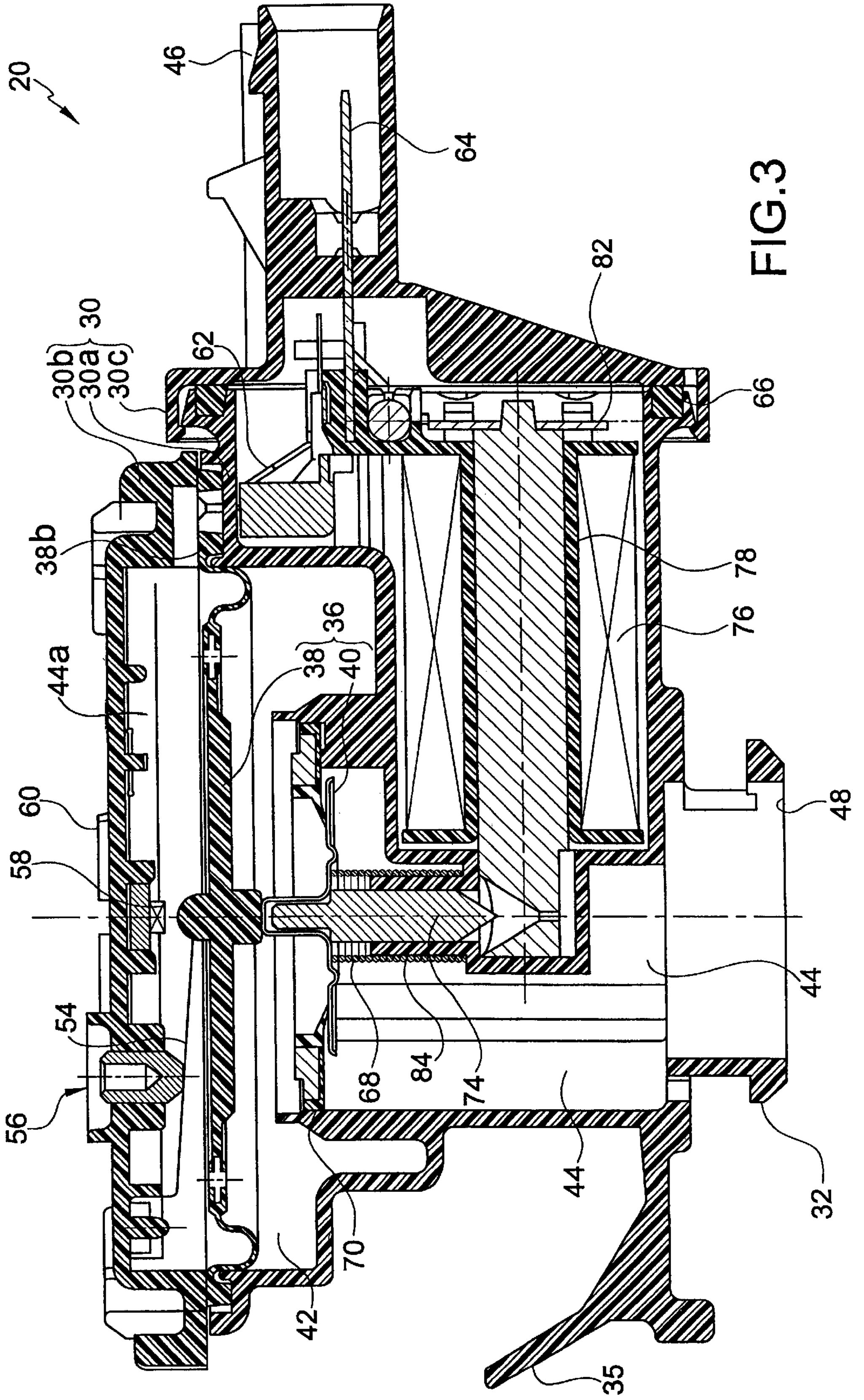
FIG. 3 is a cross-sectional view of a second embodiment of the apparatus according to the present invention.

FIG. 3 shows a second embodiment of the present invention that is substantially similar to the first embodiment shown in FIG. 2, except that the first and second signal passageways 50,52 have been eliminated, and the intermediate lead frame 62 penetrates a protrusion 38*b* of the diaphragm 38, similar to the penetration of protrusion 38*a* by the second signal passageway 52, as shown in FIG. 2. The signal from the lower portion 44 is communicated to the separate portion 44*a* via a path that extends through spaces between the solenoid 72 and the housing 30, through spaces between the intermediate lead frame 62 and the housing 30, and through the penetration in the protrusion 38*b*.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A method of calibrating an integrated pressure management apparatus, the method comprising:

providing a chamber having an interior volume varying in response to fluid pressure in the chamber, the chamber including a diaphragm displaceable between a first configuration in response to fluid pressure above a certain pressure level and a second configuration in response to fluid pressure below the certain pressure level;

providing a resilient element applying a force biasing the diaphragm toward the first configuration, the providing a resilient element includes providing a leaf spring having a first end fixed with respect to the chamber and a second end contiguously engaging the diaphragm;

providing a switch actuated by the diaphragm in the second configuration;

providing an adjuster contiguously engaging the resilient element, the providing an adjuster including providing a calibrating screw threadably mounted with respect to the chamber;

connecting the chamber to a pressure source at the certain pressure level; and adjusting the biasing force such that the switch is actuated at the certain pressure level, the adjusting includes turning the calibrating screw in contiguous engagement with an intermediate portion of the leaf spring between the first and second ends.

2. A method of calibrating an integrated pressure management apparatus, the method comprising:

providing a chamber having an interior volume varying in response to fluid pressure in the chamber, the chamber including a diaphragm displaceable between a first configuration in response to fluid pressure above a certain pressure level and a second configuration in response to fluid pressure below the certain pressure level;

providing an adjuster contiguously engaging the resilient element, the providing an adjuster including providing a calibrating screw threadably mounted with respect to the chamber;

providing a resilient element applying a force biasing the diaphragm toward the first configuration, the providing a resilient element includes providing a leaf spring having a first end fixed with respect to the housing and the calibrating screw connecting a second end of the leaf spring with respect to the chamber;

providing a switch actuated by the diaphragm in the second configuration;

connecting the chamber to a pressure source at the certain pressure level; and adjusting the biasing force such that the switch is actuated at the certain pressure level, the adjusting includes turning the calibrating screw to adjust spacing between the first and second ends.

* * * * *